United States Patent
Chen et al.

(10) Patent No.: US 11,237,416 B2
(45) Date of Patent: Feb. 1, 2022

(54) PEEP-PROOF DEVICE, DISPLAY DEVICE AND METHOD FOR DRIVING THE DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yinwei Chen, Beijing (CN); Xuerong Wang, Beijing (CN); Yali Liu, Beijing (CN); Haiwei Sun, Beijing (CN); Fei Gao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 635 days.

(21) Appl. No.: 16/097,686

(22) PCT Filed: Jan. 29, 2018

(86) PCT No.: PCT/CN2018/074424
§ 371 (c)(1),
(2) Date: Oct. 30, 2018

(87) PCT Pub. No.: WO2019/007042
PCT Pub. Date: Jan. 10, 2019

(65) Prior Publication Data
US 2021/0255491 A1     Aug. 19, 2021

(30) Foreign Application Priority Data
Jul. 6, 2017   (CN) .......................... 201710546419.0

(51) Int. Cl.
*G02F 1/1335*   (2006.01)
*G02F 1/13*     (2006.01)
(Continued)

(52) U.S. Cl.
CPC ........ *G02F 1/1323* (2013.01); *G02F 1/13306* (2013.01); *G02F 1/13439* (2013.01);
(Continued)

(58) Field of Classification Search
CPC ............... G02F 1/1323; G02F 1/13756; G02F 1/13476; G02F 1/133526; G02F 1/133371; G02F 1/133377
See application file for complete search history.

(56) References Cited

U.S. PATENT DOCUMENTS 8,614,771 B2 * 12/2013 Hong .................... H04N 13/305
349/15
9,229,261 B2 *  1/2016 Schwartz ............. G02B 26/004
(Continued)

FOREIGN PATENT DOCUMENTS

CN   101169519 A   4/2008
CN   103226257 A   7/2013
(Continued)

OTHER PUBLICATIONS

International Search Report and Written Opinion for Application No. PCT/CN2018/074424, dated May 4, 2018, 14 Pages.

*Primary Examiner* — Paisley L Wilson
(74) *Attorney, Agent, or Firm* — Brooks Kushman P.C.

(57) ABSTRACT

A peep-proof device, a display device and a method for driving the display device are provided. The peep-proof device includes at least one light beam adjustment layer. The light beam adjustment layer includes: a transparent base layer and a plurality of grooves formed in a surface of the transparent base layer; and a liquid crystal layer arranged
(Continued)

within the plurality of grooves. A refractive index of the transparent base layer is same as a refractive index of the liquid crystal layer to ordinary light beam.

17 Claims, 5 Drawing Sheets

(51) Int. Cl.
*G02F 1/137* (2006.01)
*G02F 1/1337* (2006.01)
*G02F 1/133* (2006.01)
*G02F 1/1333* (2006.01)
*G02F 1/1343* (2006.01)
*G02F 1/1347* (2006.01)

(52) U.S. Cl.
CPC ...... *G02F 1/13476* (2013.01); *G02F 1/13756* (2021.01); *G02F 1/133371* (2013.01); *G02F 1/133377* (2013.01); *G02F 1/133526* (2013.01); *G02F 1/133528* (2013.01); *G02F 1/133765* (2021.01); *G02F 2201/15* (2013.01); *G02F 2203/03* (2013.01)

(56) References Cited

U.S. PATENT DOCUMENTS

2010/0194091 A1\* 8/2010 Heim ................... B42D 25/21
283/85
2019/0033632 A1\* 1/2019 Lee ................... G02F 1/133602

FOREIGN PATENT DOCUMENTS

| CN | 103592771 A | 2/2014 |
| CN | 107065242 A | 8/2017 |
| CN | 107102460 A | 8/2017 |
| DE | 10140688 A1 | 3/2003 |

\* cited by examiner

PEEP-PROOF DEVICE, DISPLAY DEVICE AND METHOD FOR DRIVING THE DISPLAY DEVICE

CROSS-REFERENCE TO RELATED APPLICATIONS

This application is the U.S. national phase of PCT Application No. PCT/CN2018/074424 filed on Jan. 29, 2018, which claims priority to Chinese Patent Application No. 201710546419.0 filed on Jul. 6, 2017, which are incorporated herein by reference in their entireties.

TECHNICAL FIELD

The present disclosure relates to the field of display technology, in particular to a peep-proof device, a display device, and a method for driving the display device.

BACKGROUND

Along with the development of science and technology, portable display devices, as necessities, have brought convenience and entertainment to our daily lives. Currently, the majority of people are in the habit of using portable electronic devices in public places, e.g., reading, learning or communicating through mobile phones or flat-panel computers when taking or waiting for a bus. However, due to a relatively wide viewing angle of the conventional electronic device, it is possible that others beside a user can also view clearly an image displayed by the electronic device in public places. At this time, it is very difficult to provide privacy protection for the user, and thereby the use of the electronic device may be adversely affected.

SUMMARY

An object of the present disclosure is to provide a peep-proof device, a display device and a method for driving the display device, so as to provide the privacy protection during the use of the display device.

In one aspect, the present disclosure provides in some embodiments a peep-proof device, including at least one light beam adjustment layer. The light beam adjustment layer includes: a transparent base layer, a plurality of grooves being formed in a surface of the transparent base layer; and a liquid crystal layer arranged within the plurality of grooves. A refractive index of the transparent base layer is same as a refractive index of the liquid crystal layer to ordinary light beam.

In a possible embodiment of the present disclosure, the plurality of grooves is formed in the surface of the transparent base layer continuously.

In a possible embodiment of the present disclosure, a surface of each of the grooves is a part of at least one of a spherical surface, a conical surface and a surface of a frustum of a prism.

In a possible embodiment of the present disclosure, the plurality of grooves includes at least two types of grooves having different structural parameters, and the structural parameter includes at least one of a shape of the groove or a size of the groove.

In a possible embodiment of the present disclosure, the predetermined rule is that the plurality of grooves is arranged in an array form, and the grooves having different structural parameters are arranged in a first direction periodically.

In a possible embodiment of the present disclosure, the peep-proof device further includes a first transparent substrate and a second transparent substrate arranged opposite to the first transparent substrate, the light beam adjustment layer is arranged between the first transparent substrate and the second transparent substrate, and the plurality of grooves is formed in a surface of the light beam adjustment layer proximate to the first transparent substrate.

In a possible embodiment of the present disclosure, the peep-proof film includes two light beam adjustment layers laminated one on another, one of the light beam adjustment layers is arranged between the other light beam adjustment layer and the first transparent substrate, and the grooves in the transparent base layers of the different light beam adjustment layers have different structural parameters.

In a possible embodiment of the present disclosure, the transparent base layers of the different light beam adjustment layers are made of a same material.

In a possible embodiment of the present disclosure, the peep-proof device further includes a first transparent electrode layer arranged between the transparent base layer and the first transparent substrate, and a second transparent electrode layer arranged between the liquid crystal layer and the second transparent substrate.

In a possible embodiment of the present disclosure, the liquid crystal layer includes liquid crystal molecules which have been solidified in such a manner as to enable a long-axis direction of each liquid crystal molecule to be perpendicular to a plane where the first transparent substrate is located.

In a possible embodiment of the present disclosure, the peep-proof device further includes a polarizer arranged at a light-entering side of the light beam adjustment layer and configured to allow an incident light beam in a first polarization direction to pass therethrough. The long-axis direction of each liquid crystal molecule in the liquid crystal layer is perpendicular to the first transparent substrate, the first polarization direction is parallel to a first plane, and the first plane is perpendicular to the first transparent substrate and parallel to a direction in which a long side of the first transparent substrate extends.

In a possible embodiment of the present disclosure, the peep-proof device further includes a polarization state conversion mechanism arranged between the polarizer and the light beam adjustment layer, and configured to allow the incident light beam in the first polarization direction to pass therethrough, or convert the light beam in the first polarization direction into a light beam in a second polarization direction perpendicular to the first plane and emit the light beam in a second polarization direction.

In a possible embodiment of the present disclosure, the polarization state conversion mechanism includes a liquid crystal panel.

In another aspect, the present disclosure provides in some embodiments a peep-proof device, including a first transparent substrate, a second transparent substrate arranged opposite to the first transparent substrate, and a light beam adjustment layer arranged between the first transparent substrate and the second transparent substrate. The light beam adjustment layer includes a plurality of microlens structures each consisting of a transparent base layer and a liquid crystal layer. A plurality of grooves is arranged continuously in an array form in a surface of the transparent base layer adjacent to the first transparent substrate, and liquid crystal molecules are filled within the grooves. A long-axis direction of each liquid crystal molecule in the liquid crystal layer is capable of being perpendicular to the first transparent substrate, and a refractive index of the transparent base layer is same as a refractive index of the liquid crystal layer to ordinary light beam.

In a possible embodiment of the present disclosure, the grooves in adjacent rows have different shapes, different sizes or both.

In a possible embodiment of the present disclosure, a surface of each of the grooves is a part of at least one of a spherical surface, a conical surface, and a surface of a frustum of a prism.

In a possible embodiment of the present disclosure, the peep-proof device further includes a first transparent electrode layer arranged between the transparent base layer and the first transparent substrate, and a second transparent electrode layer arranged between the liquid crystal layer and the second transparent substrate.

In a possible embodiment of the present disclosure, the liquid crystal molecules in the liquid crystal layer have been cured in such a manner as to enable a long-axis direction of each of the liquid crystal molecules to be perpendicular to a plane where the first transparent substrate is located.

In yet another aspect, the present disclosure provides in some embodiments a display device, including a display module and the above-mentioned peep-proof device. The peep-proof device is arranged at a light-exiting side of the display module, and a light beam from the display module is a linearly-polarized light beam.

In a possible embodiment of the present disclosure, an orthogonal projection of each curved surface structure of the peep-proof device onto the first transparent substrate covers at least one pixel unit of the display module.

In still yet another aspect, the present disclosure provides in some embodiments a method for driving the above-mentioned display device. A polarization direction of a linearly-polarized light beam from a display module is parallel to a first plane, and the first plane is perpendicular to a plane where a first transparent substrate is located and parallel to a direction where a long side of the first transparent substrate extends. The method includes, in a peep-proof mode, enabling a long axis of each liquid crystal molecule in a liquid crystal layer of the peep-proof device to be perpendicular to the plane where the first transparent substrate is located.

In a possible embodiment of the present disclosure, the method further includes, in a display mode, enabling the long axis of each liquid crystal molecule in the liquid crystal layer of the peep-proof device to be perpendicular to the polarization direction of the light beam entering the liquid crystal layer.

According to the embodiments of the present disclosure, the light beam adjustment layer includes the transparent base layer and the liquid crystal layer, and the plurality of curved surface structures is formed in the surface of the transparent base layer, so the light beam adjustment layer is provided with the plurality of microlens mechanisms. Through the microlens mechanisms, when the peep-proof device is arranged at the light-exiting side of the display device and a user is located at a frontal viewing region, it is able for the user to clearly view an image displayed by the display device through the peep-proof device. When the user is located at a lateral viewing region, due to a scattering effect caused by the microlens structures to the display panel, it is impossible for the user to view clearly the image displayed by the display device.

DETAILED DESCRIPTION

Figure 1:
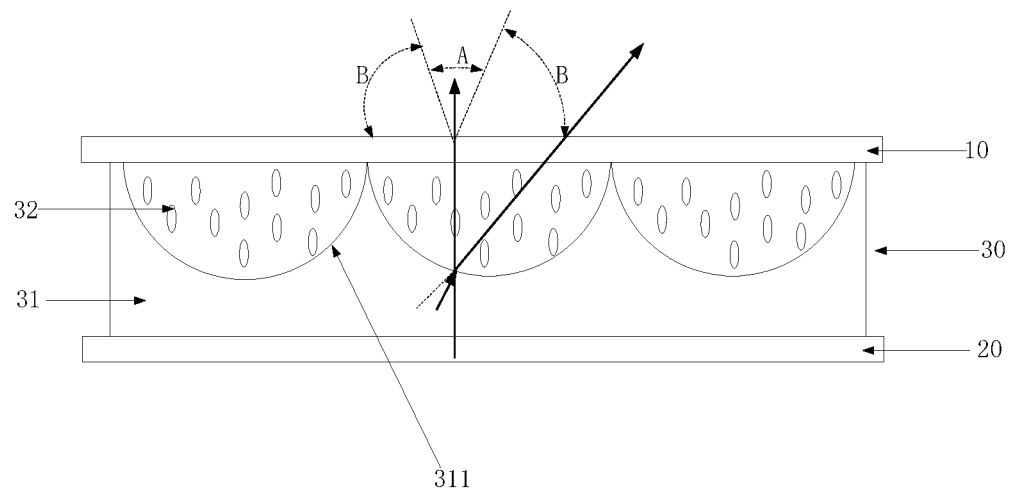
FIG. 1 is a sectional view of a peep-proof device according to some embodiments of the present disclosure.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a peep-proof device, which includes a first transparent substrate, a second transparent substrate arranged opposite to the first transparent substrate, and a light beam adjustment layer arranged between the first transparent substrate and the second transparent substrate. The light beam adjustment layer includes: a transparent base layer and a plurality of curved surface structures formed on a surface of the transparent base layer; and a liquid crystal layer arranged on surfaces of the plurality of curved surface structures in the transparent base layer. A long-axis direction of each liquid crystal molecule in the liquid crystal layer is capable of being perpendicular to the first transparent substrate and/or the second transparent substrate, and a refractive index of the transparent base layer is same as a refractive index of the liquid crystal layer to ordinary light beam. Here, when the liquid crystal layer is arranged on the surfaces of the curved surface structures in the transparent base layer, the liquid crystal layer may be filled within grooves formed by the curved surface structures, or the liquid crystal layer may be provided in a cavity defined by the first transparent substrate and the curved surface structures.

It should be appreciated that, unless otherwise defined, the so-called "perpendicular to the first transparent substrate or the second transparent substrate" refers to "perpendicular to a plane whether the first transparent substrate or the second transparent substrate is located".

According to the peep-proof device in the embodiments of the present disclosure, the light beam adjustment layer includes the transparent base layer and the liquid crystal layer, and the plurality of curved surface structures are formed on one of surfaces of the transparent base layer, so as to provide the light beam adjustment layer with a plurality of microlens mechanisms.

When the long-axis direction of each liquid crystal molecule in the liquid crystal layer is perpendicular to the first transparent substrate and/or the second transparent substrate, no birefringence may, at a frontal viewing region of the peep-proof device, occur for the incident light beam having a polarization direction perpendicular to the long-axis direction of the liquid crystal molecule due to the liquid crystal molecule. The refractive index of the transparent base layer is the same as that of the liquid crystal layer to the ordinary light beam, so the light beam may directly pass through the microlens mechanism. At a lateral viewing region of the peep-proof device, the polarization direction of the incident light beam is angled relative to the long-axis direction of the liquid crystal molecule, so the birefringence may occur due to the liquid crystal molecule. At this time, the refractive index of the transparent base layer is different from that of the liquid crystal layer, so the incident light beam may be refracted due to the microlens structure, and thereby scattered light beams may occur.

It should be appreciated that, the so-called "birefringence" refers to a phenomenon where two refracted light beams in different directions are generated when one incident light beam enters an anisotropic crystal. When the light beam passes through a heterogeneous body, its speed and refractive index may change along with its polarization direction, and it may have more than one refractive indices. When the light beam enters the heterogeneous body, except for the light beam in a particular direction, generally the birefringence may occur, and the light beam may be decomposed into two polarized light beams having polarization directions perpendicular to each other, different speeds and different refractive indices. For a monochromatic material, when the polarization direction of a light beam is perpendicular to its optical axis, a refractive index of the light beam is a refractive index of an ordinary light beam, and this light beam is called as an ordinary light beam (or ordinary ray or o-ray). The polarization direction of the other light beam is parallel to the optical axis, and this light beam is called as an extraordinary light beam (or extraordinary ray or e-ray). The two light beams are both polarized light beams. When the light beam enters the crystal in a particular direction, no birefringence may occur, and this direction is just a direction where the optical axis of the crystal extends.

The peep-proof device with the above-mentioned structure may be assembled with a display panel, so as to provide a display device with a peep-proof effect. The peep-proof device is arranged at a light-exiting side of the display panel. When a user is located at the frontal viewing region of the display device, it is able for the user to clearly view an image displayed by the display device through the peep-proof device. When the user is located at the lateral viewing region of the display device, due to a scattering effect caused by the microlens structures to the light beam emitted by the display panel, it is impossible for the user to view clearly the image displayed by the display device.

To be specific, the so-called frontal viewing region refers to, upon viewing the peep-proof device, a viewing region where an angle between a sight line of an eye to the peep-proof device and a line perpendicular to the first transparent substrate and/or the second transparent substrate is smaller than or equal to a predetermined value, and the so-called lateral viewing region refers to, upon viewing the peep-proof device, a viewing region where an angle between the sight line of the eye to the peep-proof device and the line perpendicular to the first transparent substrate and/or the second transparent substrate is greater than the predetermined value. Preferably, the predetermined value is smaller than or equal to 30°.

The structure of the peep-proof device will be described hereinafter in more details in conjunction with the drawings and embodiments. As shown in FIG. 1 which is a sectional view of the peep-proof device in some embodiments of the present disclosure, the peep-proof device includes a first transparent substrate 10, a second transparent substrate 20 arranged opposite to and parallel to the first transparent substrate 10, and a light beam adjustment layer 30 arranged between the first transparent substrate 10 and the second transparent substrate 20.

In some embodiments of the present disclosure, as shown in FIG. 1, the light beam adjustment layer 30 includes a transparent base layer 31 on a surface of which a plurality of curved surface structures 311 is formed, and a liquid crystal layer 32 arranged on surfaces of the curved surface structures 311 in the transparent base layer 31. A long-axis direction of each liquid crystal molecule in the liquid crystal layer 32 is perpendicular to the first transparent substrate 10 and the second transparent substrate 20, and a refractive index of the transparent base layer 31 is the same as a refractive index of the liquid crystal layer 32 to the ordinary light beam.

The peep-proof device in FIG. 1 is arranged at a light-exiting side of a display panel. When a light beam from the display panel has a polarization direction parallel to a first plane (a plane perpendicular to the first transparent substrate 10 and parallel to a direction in which a long side of the first transparent substrate 10 extends, i.e., a plane where a sectional cross in FIG. 1 is located, where the direction in which the long side extends is a left-to-right direction in the figure), for the incident light beam at the frontal viewing region A, the long-axis direction of each liquid crystal molecule is perpendicular to the first transparent substrate 10 and the second transparent substrate 20 and the polarization direction of the incident light beam is substantially perpendicular to the long-axis direction of the liquid crystal molecule, so merely an ordinary light beam having a constant refractive index may be generated after the incident light beam passes through the liquid crystal molecule, and no birefringence may occur for the light beam by the liquid crystal molecule. The refractive index of the transparent base layer 31 is the same as that of the liquid crystal layer 32 to the ordinary light beam, so the incident light beam may directly pass through the microlens structure, and at this time, the user may normally view an image display by the display panel. The transparent base layer may be made of plastics, polyimide, polymethyl methacrylate (PMMA), glass, or the like.

For an incident light beam at the lateral viewing region B, when the light beam passes through the light beam adjustment layer 30, the polarization direction of the incident light beam is perpendicular to a traveling direction of the light beam, and the long-axis direction of the liquid crystal molecule is perpendicular to the first transparent substrate 10 and the second transparent substrate 20. At this time, an angle between the polarization direction of the light beam in the light beam adjustment layer 30 and the long-axis direction of the liquid crystal molecule is not 90°, so the birefringence may occur due to the liquid crystal molecule, i.e., the incident light beam may be deflected and decomposed into the ordinary light beam and the extraordinary light beam in the liquid crystal molecule.

It should be appreciated that, the polarization direction of the ordinary light beam is angled by 90° relative to the long-axis direction of the liquid crystal molecule, and the refractive index of the liquid crystal molecule to the ordinary light beam is constant. The polarization direction of the extraordinary light beam is angled by an angle not equal to 90° relative to the long-axis direction of the liquid crystal molecule, and the refractive index of the liquid crystal molecule to the extraordinary light beam is associated with the polarization direction of the extraordinary light beam and the long-axis direction of the liquid crystal molecule. When the incident light beam is decomposed into the ordinary light beam and the extraordinary light beam in the liquid crystal molecule, the refractive index of the liquid crystal layer 32 to the extraordinary light beam is different from that of the transparent base layer 31. Usually, the refractive index of the liquid crystal layer 32 is greater than that of the transparent base layer 31, so the incident light beam may be refracted at an interface between the microlens structure formed by the liquid crystal layer 32 and the transparent base layer 31, so as to provide a blurry visual effect.

In some embodiments of the present disclosure, the liquid crystal molecule in the liquid crystal layer 32 is capable of being thermally cured, i.e., it may be thermally cured to be in a stable state. Through the liquid crystal layer 32 in the stable state as shown in FIG. 1, it is unnecessary to provide a deflection state control member of the liquid crystal layer for controlling a deflection state of the liquid crystal molecule. Hence, it is able to directly apply the peep-proof device to the display panel for privacy protection, thereby to simplify the structure of the peep-proof device.

In addition, in some embodiments of the present disclosure, as shown in FIG. 1, each curved surface structure 311 on the transparent base layer 31 may include a groove, and the liquid crystal layer 32 may be filled within the groove. Preferably, in order to provide an optimal peep-proof effect, the plurality of grooves may be arranged continuously in the surface of the transparent base layer 31, so as to be arranged closely along the surface of the transparent base layer 31. In addition, each groove may have a surface of a part of at least one of a spherical surface 312, a conical surface 313 and a surface of a frustum of a prism 314.

Figure 2:
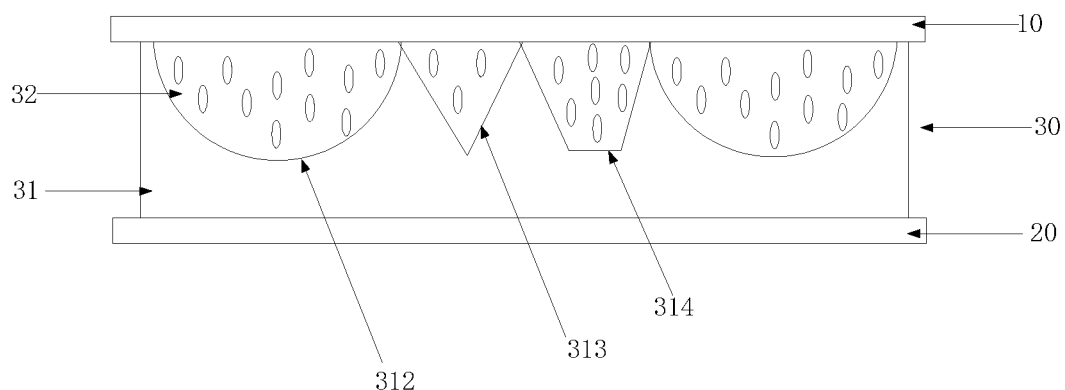
FIG. 2 is a sectional view of another peep-proof device according to some embodiments of the present disclosure.

Preferably, in some embodiments of the present disclosure, a plurality of curved surface structures 311 of different shapes and/or different sizes may be arranged on the transparent base layer 31. As shown in FIG. 2, the curved surface structures 311 on the transparent base layer 31 include first grooves 312 each having a spherical surface, second grooves 313 each having a conical surface, and third grooves 314 each having a surface of a frustum of a prism, and these three types of grooves have different sizes. In other words, the grooves may have different structural parameters. Here, the structural parameter may include a sectional shape, a depth and a curvature of a side wall of the groove. Through adjusting the structural parameter, it is able to provide the grooves with different shapes. Through the grooves with different shapes and different sizes, it is able to form the microlens mechanisms with different structures and/or different sizes when the liquid crystal layer 32 is filled within the grooves. Through the combination of the microlens mechanisms, it is able to provide good blurry visual effect with respect to texts of different sizes displayed by the display device.

Figure 3:
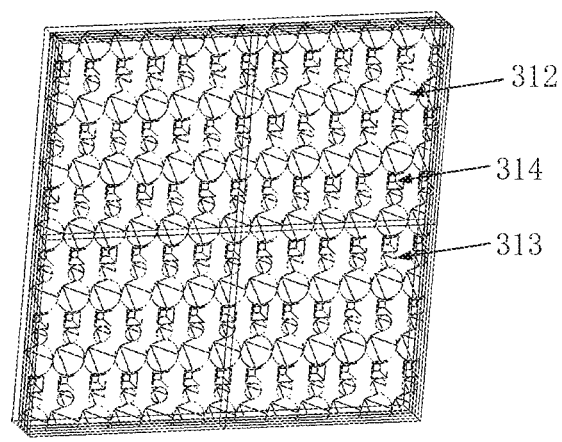
FIG. 3 is a planar view of the peep-proof device according to some embodiments of the present disclosure.

In addition, as shown in FIG. 2, the plurality of curved surface structures may be arranged in an array form, and the curved surface structures having different structural parameters may be arranged in a first direction sequentially and periodically. It should be appreciated that, the plurality of curved surface structures may be arranged, but not limited to, in a regular form, e.g., in a matrix form or a cellular form. The first direction may be a row direction or a column direction. As shown in FIG. 3, the plurality of microlens mechanisms may be arranged in rows, and in each row, the first groove 312, the second groove 313 and the third groove 314 may be arranged sequentially corresponding to respective microlens being formed. It should be appreciated that, the arrangement of the microlens mechanism having different shapes and/or different sizes may not be limited to those in FIGS. 2 and 3. For example, the plurality of microlens mechanisms may be arranged in a rectangle form, or in a parallelogram form with adjacent rows being staggered from each other. In a word, the plurality of curved surface mechanisms (i.e., the microlens mechanisms) having different shapes and/or different sizes may be arranged in an array form.

In some embodiments of the present disclosure, in order to provide a better scattering effect at the lateral viewing region through the microlens mechanisms, a width of the microlens mechanism shall be smaller than, usually one tenth of or less, a width of a word to be displayed on the display panel with the peep-proof device.

Figure 4:
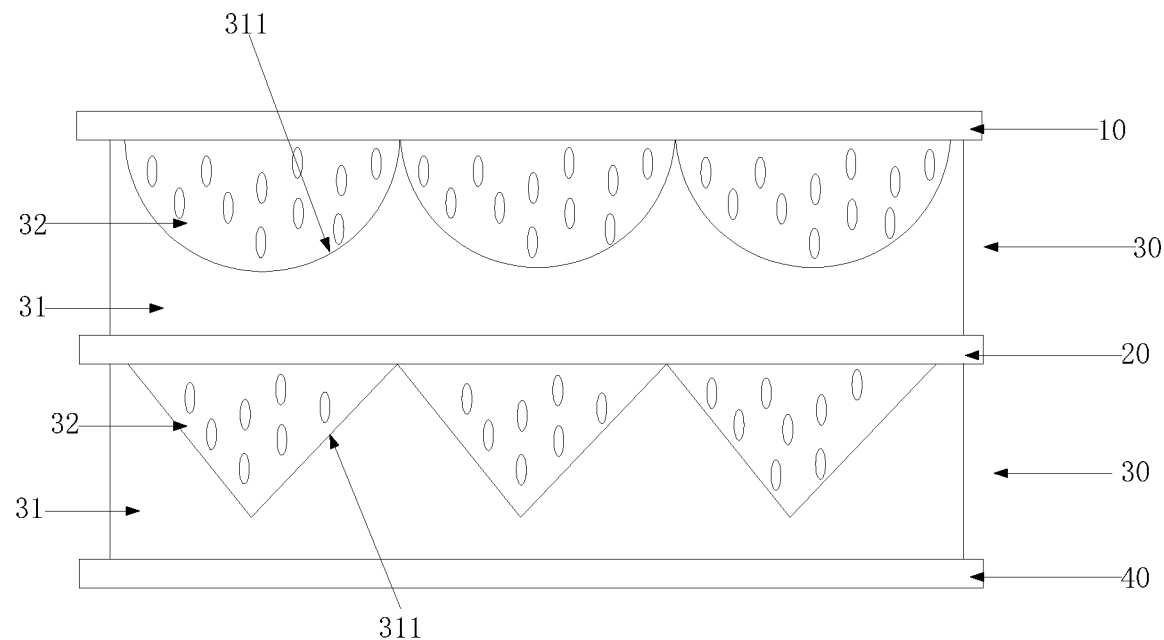
FIG. 4 is a sectional view of yet another peep-proof device according to some embodiments of the present disclosure.

In some embodiments of the present disclosure, as shown in FIG. 4, the peep-proof device may include at least two light beam adjustment layers laminated one on another. To be specific, the peep-proof device may include the first transparent substrate 10, the second transparent substrate 20 and a third transparent substrate 40 arranged parallel to each other. A first light beam adjustment layer 30 may be arranged between the first transparent substrate 10 and the second transparent substrate 20, and a second light beam adjustment layer 30 may be arranged between the second transparent substrate 20 and the third transparent substrate 40. Each light beam adjustment layer 30 may include the transparent base layer 31 on a surface of which the plurality of curved surface structures 311 is formed, and the liquid crystal layer 32 arranged on surfaces of the curved surface structures 311 in the transparent base layer 31. The long-axis direction of each liquid crystal molecule in the liquid crystal layer 32 is perpendicular to the first transparent substrate 10 and the second transparent substrate 20, and the refractive index of the transparent base layer 31 to the ordinary light beam is the same as the refractive index of the liquid crystal layer 32 to the ordinary light beam.

Based on the above-mentioned principle of the peep-proof device in FIG. 1, the plurality of curved surface structures 311 of each light beam adjustment layer 30 may form a plurality of microlens mechanisms. At the frontal viewing region of the peep-proof device, the microlens mechanisms of each light beam adjustment layer may allow the incident light beam to pass therethrough. At the lateral viewing region of the peep-proof device, the incident light beams may be refracted in the microlens mechanism of each light beam adjustment layer 30, so as to scatter the light beams passing through the peep-proof device.

In FIG. 4, for each light beam adjustment layer 30, the curved surface structures 311 on the transparent base layer 31 may have different shapes and/or different sizes. For example, the curved surface structures 311 of the upper first light beam adjustment layer 30 may include a plurality of grooves each having a spherical surface arranged sequentially, while the curved surface structures 311 of the lower light beam adjustment layer 30 may include a plurality of grooves each having a conical surface arranged sequentially. It should be appreciated that the present disclosure is not limited thereto. Based on this arrangement, it is able to form the microlens mechanisms on the two light beam adjustment layers 30 arranged in different ways, thereby to provide good blurry visual effect with respect to texts of different sizes to be displayed on the display panel through the combination of the microlens mechanisms at different layers.

In some embodiments of the present disclosure, the transparent base layer 31 may be made of an ultraviolet (UV)-curable adhesive having a single refractive index. The liquid crystal molecules in the liquid crystal layer 32 may be cured so as to be in a stable state. The peep-proof device with the mentioned structure may cooperate with the display panel, so as to provide peep-proof effect when the light beam from the display panel has a polarization direction parallel to the first plane.

According to the peep-proof device in the embodiments of the present disclosure, the plurality of microlens mechanisms is formed through the liquid crystal layer and the transparent base layer. Through characteristics of the liquid crystal molecules scattering the light beam, the light beams at the lateral viewing region may be scattered, so as to provide a blurry visual effect with respect to the content displayed on the display panel, thereby to provide a better peep-proof effect and prevent the peep-proof effect of the display device from being adversely affected by a manufacture process. In addition, based on the generation of the peep-proof effect, no light loss occurs for the display panel as compared with a peep-proof display device having backlight power dissipation in the related art, so it is able to improve a luminous effect.

Figure 5:
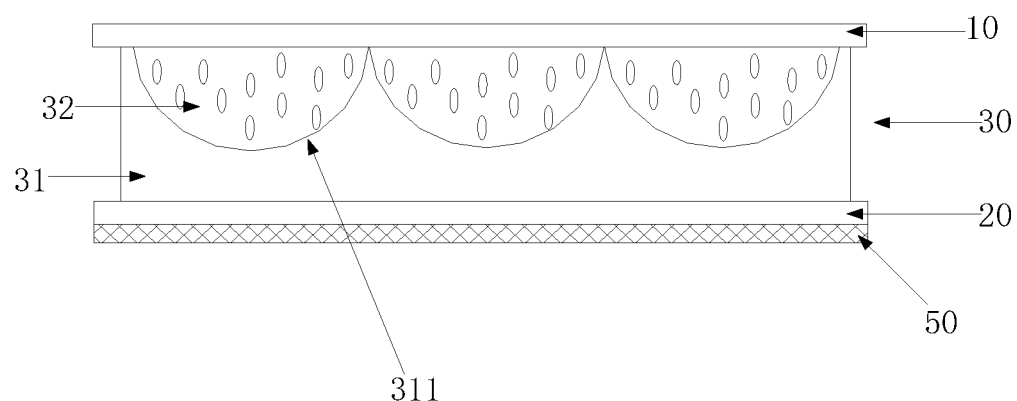
FIG. 5 is a sectional view of still yet another peep-proof device according to some embodiments of the present disclosure.

As shown in FIG. 5 which is another sectional view of the peep-proof device, the peep-proof device includes the first transparent substrate 10, the second transparent substrate 20 arranged opposite to, and parallel to, the first transparent substrate 10, and the light beam adjustment layer 30 arranged between the first transparent substrate 10 and the second transparent substrate 20.

The light beam adjustment layer 30 includes the transparent base layer 31 on a surface of which the plurality of curved surface structures 311 is formed, and the liquid crystal layer 32 arranged on the surfaces of the plurality of curved surface structures 311. The long-axis direction of each liquid crystal molecule in the liquid crystal layer 32 is perpendicular to the first transparent substrate 10 and the second transparent substrate 20, and the refractive index of the transparent base layer 31 is the same as the refractive index of the liquid crystal layer 32 to the ordinary light beam.

In some embodiments of the present disclosure, the liquid crystal layer 32 may be cured in such a manner as to enable the long-axis direction of the liquid crystal molecule to be stably perpendicular to the first transparent substrate 10 and the second transparent substrate 20.

In some embodiments of the present disclosure, the peep-proof device further includes a polarizer 50 arranged at a light-entering side of the light beam adjustment layer 30 and configured to allow an incident light beam in a first polarization direction to pass therethrough. The first polarization direction is parallel to a first plane, and the first plane is perpendicular to the first transparent substrate 10 and parallel to a direction in which a long side of the first transparent substrate 10 extends.

In some embodiment of the present disclosure, the principle of the light beam adjustment layer 30 for the privacy protection is the same as that mentioned hereinabove, and thus will not be particularly defined herein. In the embodiments of the present disclosure, through the polarizer 50, it is able to ensure that the light beam entering the light beam adjustment layer 30 is in the first polarization direction, i.e., a direction parallel to the first plane (a plane perpendicular to the first transparent substrate 10 and parallel to the direction in which the long side of the first transparent substrate 10 extends). As shown in FIGS. 1 and 5, it is able to ensure that the polarization direction of the light beam at the lateral viewing region of the peep-proof device is angled by an angle not equal to 90° relative to the long-axis direction of the liquid crystal molecule, and generate the birefringence phenomenon. As a result, it is able to scatter the light beam due to the different refractive index of the liquid crystal layer from the transparent base layer, thereby to achieve the peep-proof effect.

Hence, in the peep-proof device, regardless of the polarization direction of the light beam from the display panel, it is able for the peep-proof device in the embodiments of the present disclosure to achieve the privacy protection.

In some embodiments of the present disclosure, the curved-surface structures 311 on the transparent base layer 31 include a plurality of grooves arranged continuously in a surface of the transparent base layer 31. The grooves are arranged closely along the surface of the transparent base layer 31. In addition, each groove has a surface of a part of at least one of a spherical surface, a conical surface and a surface of a frustum of a prism. In addition, as shown in FIG. 2, the curved surface structures 311 having different shapes and/or different sizes may also be arranged on the transparent base layer 31, so as to form a plurality of microlens mechanisms having different shapes and/or different sizes, which will not be particularly defined herein. Identically, the peep-proof device may also include at least two light beam adjustment layers, and as shown in FIG. 4, the microlens mechanisms in each light beam adjustment layer may also have different shapes and/or different sizes, which will not be particularly defined herein.

Figure 6:
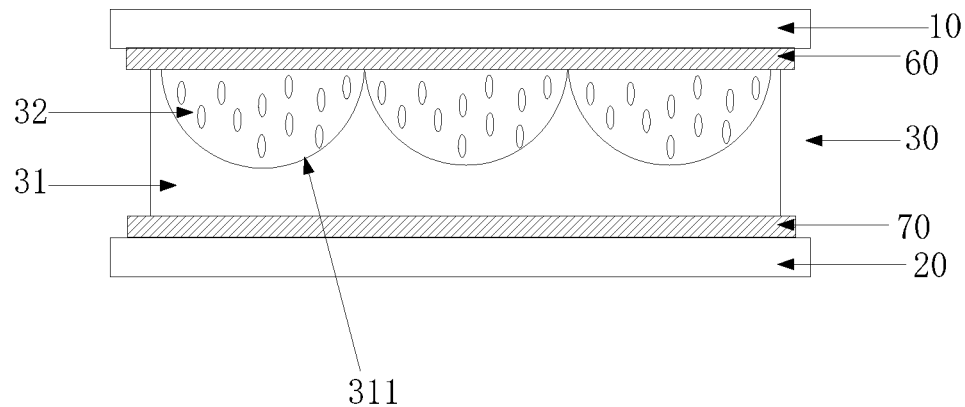
FIG. 6 is a sectional view of the peep-proof device in an active mode according to some embodiments of the present disclosure.
Figure 7:
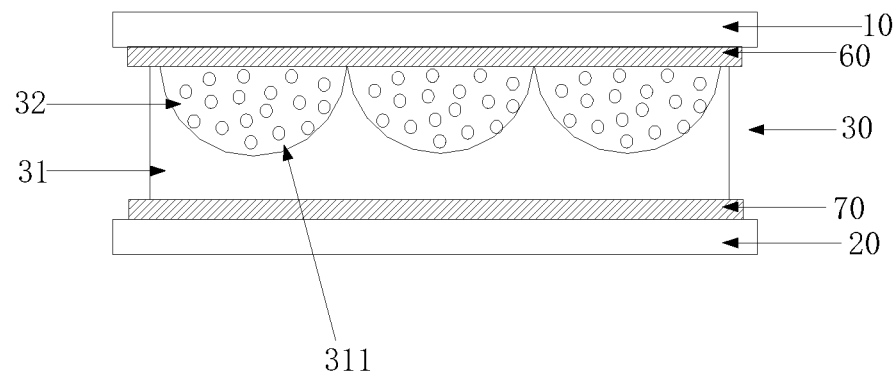
FIG. 7 is a sectional view of the peep-proof device in another active mode according to some embodiments of the present disclosure.

In some embodiments of the present disclosure, as shown in FIGS. 6 and 7, the peep-proof device includes the first transparent substrate 10, the second transparent substrate 20 arranged opposite to, and parallel to, the first transparent substrate 10, and the light beam adjustment layer 30 arranged between the first transparent substrate 10 and the second transparent substrate 20.

To be specific, as shown in FIGS. 6 and 7, the light beam adjustment layer 30 includes the transparent base layer 31 on a surface of which the plurality of curved surface structures 311 is formed, and the liquid crystal layer 32 arranged on the surfaces of the plurality of curved surface structures 311. The refractive index of the transparent base layer 31 is the same as the refractive index of the liquid crystal layer 32 to the ordinary light beam.

In some embodiments of the present disclosure, the peep-proof device further includes a first transparent electrode layer 60 arranged between the transparent base layer 31 and the first transparent substrate 10, and a second transparent electrode layer 70 arranged between the liquid crystal layer 32 and the second transparent substrate 20. A distance between the second transparent substrate 20 and the liquid crystal layer 32 is smaller than a distance between the second transparent substrate 20 and the transparent base layer 31.

Here, each transparent electrode layer may include a surface-like electrode, or a plurality of strip-like electrodes corresponding to locations of the grooves respectively. For the grooves with different depths, different voltages may be applied to the liquid crystal molecules within the grooves in accordance with the practical need, so as to enable the liquid crystal molecules to maintain in an erect state.

In the embodiments of the present disclosure, the first transparent electrode layer 60 and the second transparent electrode layer 70 are arranged at two sides of the light beam adjustment layer 30 respectively. The voltage is applied between the first transparent electrode layer 60 and the second transparent electrode layer 70, so as to enable the liquid crystal molecule in the liquid crystal layer 32 to be in a state where the long-axis direction of the liquid crystal molecule is parallel to the first transparent substrate 10 and the second transparent substrate 20 as shown in FIG. 7, or in a state where the long-axis direction of the liquid crystal molecule is perpendicular to the first transparent substrate 10 and the second transparent substrate 20 as shown in FIG. 6. To be specific, when the liquid crystal molecule is in the state in FIG. 7, the voltage of 0 is applied between the first transparent electrode layer 60 and the second transparent electrode layer 70, and the liquid crystal molecules are arranged in a rubbing alignment direction (a direction perpendicular to the first plane, i.e., a paper surface). When the liquid crystal molecule is in the state in FIG. 6, the voltage of a predetermined value is applied between the first transparent electrode layer 60 and the second transparent electrode layer 70, so that the long-axis direction of each liquid crystal molecule is perpendicular to the plane where the first transparent substrate 10 is located.

Preferably, the first transparent electrode layer 60 and the second transparent electrode layer 70 may each be a surface-like electrode and made of indium tin oxide (ITO).

As shown in FIG. 6, when the long-axis direction of each liquid crystal molecule in the liquid crystal layer 32 is perpendicular to the first transparent substrate 10 and the second transparent substrate 20, and the polarization direction of the light beam entering the light beam adjustment layer 30 is parallel to the first plane, the peep-proof device has a same structure as that in FIG. 1. Based on the working principle in FIG. 1, in this state, at the frontal viewing region A, the polarization direction of the incident light beam is perpendicular to the long-axis direction of the liquid crystal molecule, so no birefringence may occur for the incident light beam by the liquid crystal molecule. The refractive index of the transparent base layer 31 is the same as that of the liquid crystal layer 32 to the ordinary light beam, so the light beam may directly pass through the microlens mechanism, and the user may normally view the image displayed on the display panel. At the lateral viewing region B, the polarization direction of the incident light beam is angled by an angle not equal to 90° relative to the long-axis direction of the liquid crystal molecule, so the birefringence may occur due to the liquid crystal molecule, and the incident light beam may be refracted and decomposed into the ordinary light beam and the extraordinary light beam in the liquid crystal molecule. The refractive index of the liquid crystal layer 32 is different from that of the transparent base layer 31, so the incident light beam may be refracted at an interface between the microlens mechanism formed through the liquid crystal layer 32 and the transparent base layer 31, so as to provide a blurry visual effect. Hence, when the peep-proof device in FIG. 6 is assembled with the display panel to form the display device and the polarization direction of the light beam from the display panel is parallel to the first plane, it is able to provide the display device with a peep-proof effect.

As shown in FIG. 7, when the long-axis direction of each liquid crystal molecule in the liquid crystal layer 32 is parallel to the first transparent substrate 10 and the second transparent substrate 20 and perpendicular to the direction in which the long side of the first transparent substrate 10 extends, the long-axis direction of the liquid crystal molecule is perpendicular to the first plane. When the polarization direction of the incident light beam entering the light beam adjustment layer 30 is parallel to the first plane, the polarization direction of the light beam is perpendicular to the long-axis direction of the liquid crystal molecule at both the frontal viewing region A and the lateral viewing region B. At this time, merely the ordinary light beam may pass through the liquid crystal layer 32, i.e., the refractive index of the liquid crystal layer 32 is equal to that of the liquid crystal layer 32 to the ordinary light beam. The refractive index of the transparent base layer 31 is the same as that of the liquid crystal layer 32 to the ordinary light beam, so the incident light beam may not be refracted in the light beam adjustment layer 30, and instead it may directly pass therethrough.

Based on the above, when the peep-proof device is in the active mode as shown in FIG. 7, regardless of an inclination angle of the incident light beam relative to the plane where the first transparent substrate 10 is located, the light beam may directly pass through the first transparent substrate 10 as long as the polarization direction of the light beam is parallel to the first plane and the long-axis direction of the liquid crystal molecule is perpendicular to the first plane. Hence, when the peep-proof device in the active mode is assembled with the display panel to form the display device and the polarization direction of the light beam from the display panel is parallel to the first plane, the display device is in a normal active state and incapable of providing any peep-proof effect.

In some embodiments of the present disclosure, the first transparent electrode layer 60 and the second transparent electrode layer 70 are provided so as to control a deflection state of each liquid crystal molecule in the liquid crystal layer 32. At this time, it is able to switch the display panel with the peep-proof device between a peep-proof mode in which the content displayed on the display panel is capable of being viewed clearly by the user merely at the frontal viewing region A and a display mode in which the content displayed on the display panel is capable of being viewed clearly by the user at the entire viewing region.

In some embodiments of the present disclosure, the curved surface structures 311 on the transparent base layer 31 include a plurality of grooves arranged continuously on the surface of the transparent base layer 31, and the grooves are arranged closely along the surface of the transparent base layer 31. In addition, each groove has a surface of a part of at least one of a spherical surface, a conical surface and a surface of a frustum of a prism. As shown in FIG. 2, the curved surface structures 311 having different shapes and/or different sizes may also be arranged on the transparent base layer 31, so as to form a plurality of microlens mechanisms having different shapes and/or different sizes, which will not be particularly defined herein.

Figure 8:
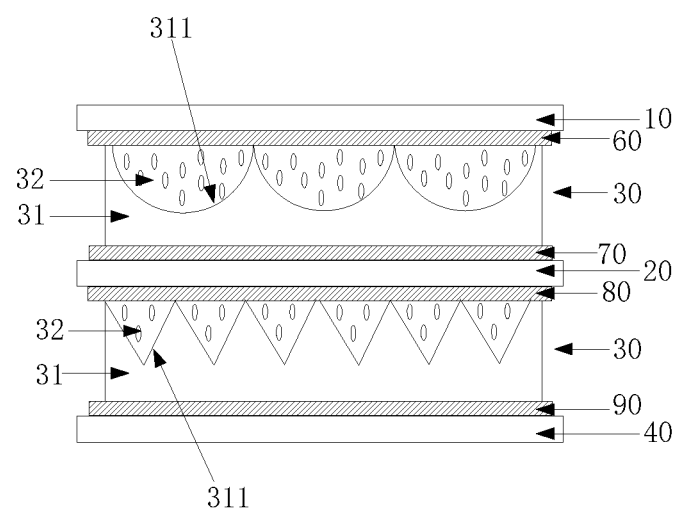
FIG. 8 is a sectional view of the peep-proof device in yet another active mode according to some embodiments of the present disclosure.

In some embodiments of the present disclosure, as shown in FIG. 8, the peep-proof device includes at least two light beam adjustment layers laminated one on another, and the transparent electrode layers are arranged at two sides of each light beam adjustment layer respectively. To be specific, as shown in FIG. 8, the peep-proof device includes the first transparent substrate 10, the second transparent substrate 20 and the third transparent substrate 40 arranged parallel to each other. The first light beam adjustment layer 30 is arranged between the first transparent substrate 10 and the second transparent substrate 20, and the second light beam adjustment layer 30 is arranged between the second transparent substrate 20 and the third transparent substrate 40. Each light beam adjustment layer 30 includes the transparent base layer 31 on a surface of which the plurality of curved surface structures 311 is formed, and the liquid crystal layer 32 arranged on surfaces of the curved surface structures 311 in the transparent base layer 31. For each light beam adjustment layer 30, the refractive index of the transparent base layer 31 is the same as the refractive index of the liquid crystal layer 32 to the ordinary light beam.

In some embodiments of the present disclosure, the first transparent electrode layer 60 and the second transparent electrode layer 70 are arranged at two sides of the upper first light beam adjustment layer 30 respectively, and a third transparent electrode layer 80 and a fourth transparent electrode layer 90 are arranged at two sides of the lower light beam adjustment layer 30 respectively. In this way, the deflection state of each liquid crystal molecule in the liquid crystal layer 32 of the upper light beam adjustment layer 30 is controlled through the first transparent electrode layer 60 and the second transparent electrode layer 70, and the deflection state of each liquid crystal molecule in the liquid crystal layer 32 of the lower light beam adjustment layer 30 is controlled through the third transparent electrode layer 80 and the fourth transparent electrode layer 90.

The working principle of the peep-proof device including the at least two light beam adjustment layers 30 is the same as that mentioned above, and thus will not be particularly defined herein. To be specific, when the long-axis direction of each liquid crystal molecule in each light beam adjustment layer 30 is perpendicular to the first transparent substrate 10 and the second transparent substrate 20 and the polarization direction of the incident light beam entering the light beam adjustment layer 30 is parallel to the first plane, the peep-proof device is in the peep-proof mode. When the long-axis direction of each liquid crystal molecule of the liquid crystal layer 32 in each light beam adjustment layer 30 is parallel to the first transparent substrate 10 and the second transparent substrate 20 and perpendicular to the direction in which the long side of the first transparent substrate 10 extends and the polarization direction of the incident light beam entering the light beam adjustment layer 30 is parallel to the first polarization direction, the peep-proof device is in the display mode.

In some embodiments of the present disclosure, as shown in FIG. 8, for each light beam adjustment layer 30, the curved surface structures 311 on the transparent base layer 31 may have different shapes and/or different sizes. For example, the curved surface structures 311 of the upper first light beam adjustment layer 30 may include a plurality of grooves each having a spherical surface arranged sequentially, while the curved surface structures 311 of the lower light beam adjustment layer 30 may include a plurality of grooves each having a conical surface arranged sequentially. It should be appreciated that the present disclosure is not limited thereto. Based on this arrangement, it is able to form the microlens mechanisms on the two light beam adjustment layers 30 arranged in different ways, thereby to provide a better blurry visual effect with respect to texts of different sizes to be displayed on the display panel through the combination of the microlens mechanisms at different layers.

Figure 9:
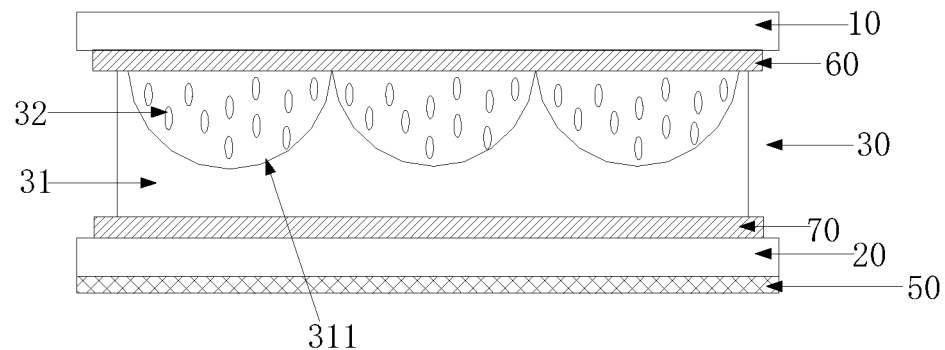
FIG. 9 is a sectional view of the peep-proof device in still yet another active mode according to some embodiments of the present disclosure.

In some embodiments of the present disclosure, as shown in FIG. 9, the peep-proof device includes the first transparent substrate 10, the second transparent substrate 20 arranged opposite to, and parallel to, the first transparent substrate 10, and the light beam adjustment layer 30 arranged between the first transparent substrate 10 and the second transparent substrate 20.

In some embodiments of the present disclosure, as shown in FIG. 9, the light beam adjustment layer 30 includes the transparent base layer 31 on a surface of which the plurality of curved surface structures 311 is formed, and the liquid crystal layer 32 arranged on the surfaces of the plurality of curved surface structures 311. The refractive index of the transparent base layer 31 is the same as the refractive index of the liquid crystal layer 32 to the ordinary light beam.

In some embodiments of the present disclosure, the peep-proof device further includes the first transparent electrode layer 60 arranged between the transparent base layer 31 and the first transparent substrate 10, and the second transparent electrode layer 70 arranged between the liquid crystal layer 32 and the second transparent substrate 20. A distance between the second transparent substrate 20 and the liquid crystal layer 32 is smaller than a distance between the second transparent substrate 20 and the transparent base layer 31.

As mentioned above, through the first transparent electrode layer 60 and the second transparent electrode layer 70, it is able to change the deflection state of each liquid crystal molecule in the liquid crystal layer 32 in such a manner as to enable the long-axis direction of the liquid crystal molecule to be parallel to the first transparent substrate 10 and the second transparent substrate 20 and perpendicular to the direction in which the long side of the first transparent substrate 10 extends as shown in FIG. 7, or enable the long-axis direction of the liquid crystal molecule to be perpendicular to the first transparent substrate 10 and the second transparent substrate 20 as shown in FIG. 9.

In some embodiments of the present disclosure, the peep-proof device further includes the polarizer 50 arranged at the light-entering side of the light beam adjustment layer 30 and configured to allow the light beam in the first polarization direction to pass therethrough. The first polarization direction is parallel to the first plane, and the first plane is perpendicular to the first transparent substrate 10 and parallel to the direction in which the long side of the first transparent substrate 10 extends.

In the embodiments of the present disclosure, through the polarizer 50, it is able to ensure that the light beam entering the light beam adjustment layer 30 is in the first polarization direction, i.e., a direction parallel to the first plane. Through the first transparent electrode layer 60 and the second transparent electrode layer 70, when the long-axis direction of each liquid crystal molecule in the liquid crystal layer 32 is perpendicular to the first transparent substrate 10 and the second transparent substrate 20 and the light beam in the first polarization direction enters the light beam adjustment layer 30, the peep-proof device is in the peep-proof mode. When the long-axis direction of each liquid crystal molecule in the liquid crystal layer 32 is parallel to the first transparent substrate 10 and the second transparent substrate 20 and perpendicular to the direction in which the long side of the first transparent substrate 10 extends and the light beam in the first polarization direction enters the light beam adjustment layer 30, the peep-proof device is in the display mode.

The working principles in the peep-proof mode and the display mode are the same as those mentioned above, and thus will not be particularly defined herein.

Figure 10:
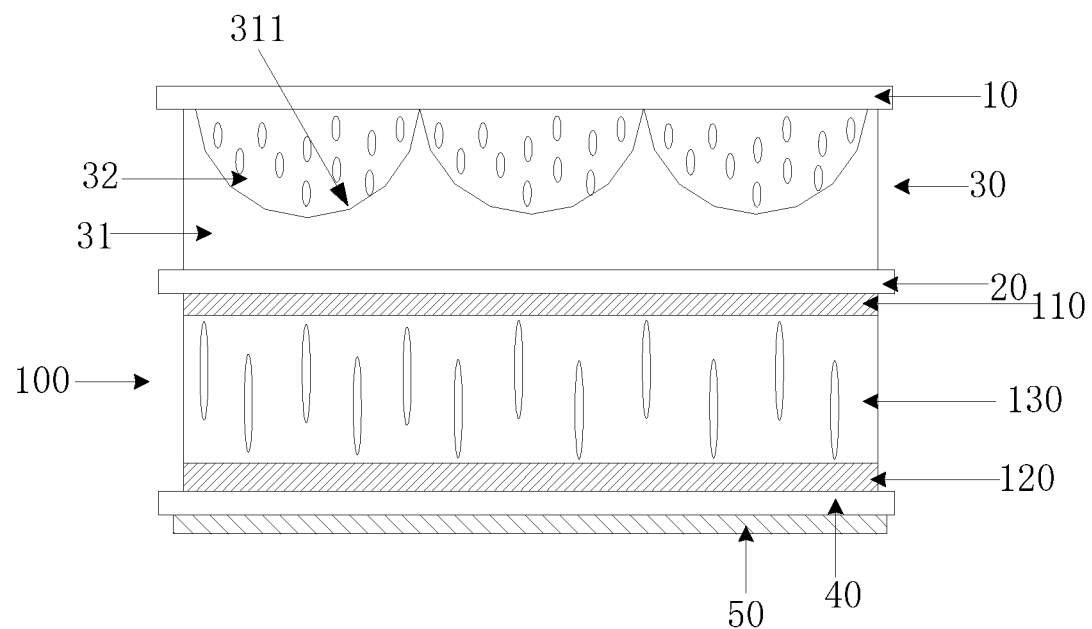
FIG. 10 is a sectional view of the peep-proof device in still yet another active mode according to some embodiments of the present disclosure.
Figure 11:
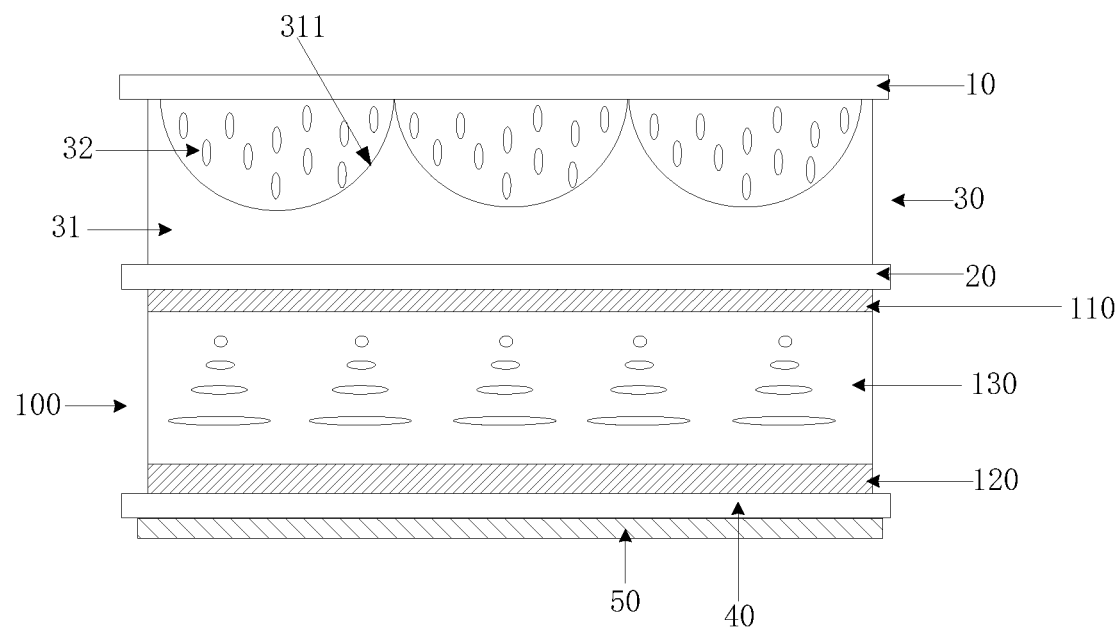
FIG. 11 is a sectional view of the peep-proof device in still yet another active mode according to some embodiments of the present disclosure.

In some embodiments of the present disclosure, as shown in FIGS. 10 and 11, the peep-proof device includes the first transparent substrate 10, the second transparent substrate 20 arranged opposite to, and parallel to, the first transparent substrate 10, and the light beam adjustment layer 30 arranged between the first transparent substrate 10 and the second transparent substrate 20.

To be specific, the light beam adjustment layer 30 includes the transparent base layer 31 on a surface of which the plurality of curved surface structures 311 is formed, and the liquid crystal layer 32 arranged on the surfaces of the plurality of curved surface structures 311. The long-axis direction of each liquid crystal molecule in the liquid crystal layer 32 is perpendicular to the first transparent substrate 10 and the second transparent substrate 20, and the refractive index of the transparent base layer 31 is the same as the refractive index of the liquid crystal layer 32 to the ordinary light beam.

In the embodiments of the present disclosure, the liquid crystal molecule in the liquid crystal layer 32 is capable of being thermally cured, i.e., it may be thermally cured to be in a stable state where the long-axis direction of the liquid crystal molecule is perpendicular to the first transparent substrate 10 and the second transparent substrate 20.

In some embodiments of the present disclosure, the peep-proof device further includes the polarizer 50 arranged at the light-entering side of the light beam adjustment layer 30 and configured to allow the light beam in the first polarization direction to pass therethrough. The first polarization direction is parallel to the first plane, and the first plane is perpendicular to the first transparent substrate 10 and parallel to the direction in which the long side of the first transparent substrate 10 extends.

In addition, the peep-proof device further includes a deflection state conversion mechanism 100 arranged between the polarizer 50 and the light beam adjustment layer 30, and configured to allow the light beam in the first polarization direction to pass therethrough, or convert the light beam in the first polarization direction into a light beam in a second polarization direction perpendicular to the first plane and emit the converted light beam.

As shown in FIGS. 10 and 11, the deflection state conversion mechanism 100 includes a third transparent substrate 40 arranged parallel to the second transparent substrate 20, and a fifth electrode layer 110, a sixth electrode layer 120 and a first liquid crystal layer 130 arranged between the second transparent substrate 20 and the third transparent substrate 40. The fifth electrode layer 110 is arranged parallel to the sixth electrode layer 120, and the first liquid crystal layer 130 is arranged between the fifth electrode layer 110 and the sixth electrode layer 120.

Preferably, the fifth electrode layer 110 and the sixth electrode layer 120 are each a surface-like electrode. Through applying different voltages between the fifth electrode layer 110 and the sixth electrode layer 120, it is able to control the light beam entering the first liquid crystal layer 130 to exit from the first liquid crystal layer 130 in its original polarization direction, or in a converted polarization direction.

To be specific, as shown in FIGS. 10 and 11, the polarizer 50 is attached onto the third transparent substrate 40. The light beam enters the polarizer 50, and then exits from the polarizer 50 in the first polarization direction.

When the deflection state conversion mechanism 100 is in a first operating state, as shown in FIG. 10, the incident light beam in the first polarization direction is allowed to pass through the deflection state conversion mechanism 100 directly to the light beam adjustment layer 30. Because each liquid crystal molecule in the light beam adjustment layer 30 is perpendicular to the first transparent substrate 10 and the second transparent substrate 20, an optical path of the incident light beam in this polarization state in the light beam adjustment layer 30 is the same as that in FIG. 1. At this time, the peep-proof device is in the peep-proof mode. The working principle thereof may refer to that mentioned above, and thus will not be particularly defined herein.

When the deflection state conversion mechanism 100 is in a second operating state, as shown in FIG. 11, the incident light beam in the first polarization direction is converted by the deflection state conversion mechanism 100 into the light beam in a second polarization direction perpendicular to the first plane. It should be appreciated that, the deflection state conversion mechanism 100 may be a liquid crystal cell. Due to the optical activity of the liquid crystal molecule, the deflection direction of the light beam may be rotated by 90°. When the light beam in the second polarization direction enters the light beam adjustment layer 30, the polarization direction of the light beam is perpendicular to the long-axis direction of the liquid crystal molecule, so merely the ordinary light beam may pass through the liquid crystal layer 32 (i.e., the refractive index of the liquid crystal layer 32 is equal to that of the liquid crystal layer 32 to the ordinary light beam), regardless of an incident angle of the incident light beam relative to the second transparent substrate 20. The refractive index of the liquid crystal layer 32 is the same as that of the liquid crystal layer 32 to the ordinary light beam. In addition, the refractive index of the transparent base layer 31 is the same as that of the liquid crystal layer 32 to the ordinary light beam, so the incident light beam may not be refracted in the light beam adjustment layer 30, and instead it may directly pass therethrough. At this time, the peep-proof device is in the display mode where the display panel is capable of displaying an image normally.

In the embodiments of the present disclosure, through the deflection state conversion mechanism 100 capable of being switching between the first operating state and the second operating state, it is able to switch the peep-proof device between the peep-proof mode and the display mode. A working principle of the deflection state conversion mechanism 100 is known in the art, and thus will not be particularly defined herein.

It should be appreciated that, in some embodiments of the present disclosure, the peep-proof device may not be provided with any polarizer 50. At this time, through controlling the light beam from the display panel to be in the first polarization direction, it is also able to achieve the peep-proof effect, and switch the peep-proof device between the peep-proof mode and the display mode.

According to the peep-proof device in the embodiments of the present disclosure, it is able to achieve the peep-proof effect without causing any light loss for the light beam from the display panel. In addition, it is able to switch the peep-proof device between the display mode and the peep-proof mode, so as to be adapted to various application scenarios.

Figure 12:
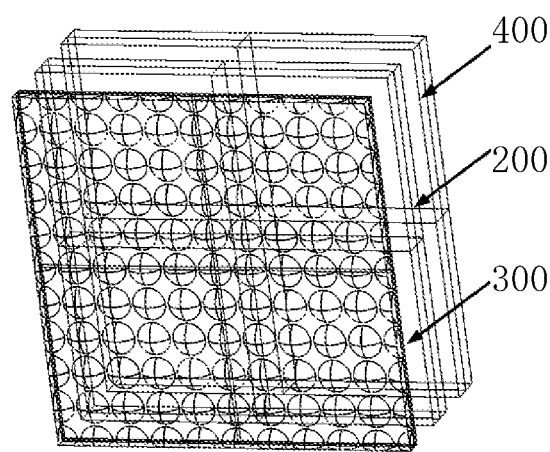
FIG. 12 is a schematic view showing a display device according to some embodiments of the present disclosure.

The present disclosure further provides in some embodiments a display device which, as shown in FIG. 12, include a display module and the above-mentioned peep-proof device. The display module includes a display panel 200 and a backlight module 400. The peep-proof device 300 is arranged at a light-exiting side of the display panel 200, and a light beam from the display panel 200 is a linearly-polarized light beam.

A specific structure acquired when the peep-proof device 300 is assembled with the display module is known in the art, and thus will not be particularly defined herein.

In addition, when the peep-proof device 300 includes the polarizer, a side of the peep-proof device 300 with the polarizer may be arranged adjacent to the display module. In this way, the light beam from the display module passes through the polarizer and enters the peep-proof device 300, so as to achieve the peep-proof effect.

Preferably, when the peep-proof device 300 includes the polarizer, the light beam entering the peep-proof device 300 may be in the first polarization direction, i.e., a direction parallel to the first plane. The first plane is a plane perpendicular to the first transparent substrate 10 and parallel to the direction in which the long side of the first transparent substrate 10 extends.

Preferably, in order to achieve a good peep-proof effect, as shown in FIGS. 1 to 11, an orthogonal projection of each curved surface structure of the peep-proof device 300 onto the first transparent substrate or the second transparent substrate covers at least one pixel unit of the display module.

Preferably, the curved surface structures of the peep-proof device 300 may be of various shapes and/or various sizes, so as to enable the light beam to be refracted randomly as possible in the peep-proof mode, thereby to achieve a good peep-proof effect.

The present disclosure further provides in some embodiments a method for driving the above-mentioned display device. The linearly-polarized light beam from the display module of the display device has a polarization direction (i.e., the first polarization direction) parallel to the first plane, and the first plane is perpendicular to the first transparent substrate and parallel to the direction in which the long side of the first transparent substrate extends. The method includes, in the peep-proof mode, enabling the long axis of each liquid crystal molecule in the liquid crystal layer of the peep-proof device to be perpendicular to the first transparent substrate.

In some embodiments of the present disclosure, the method further includes, in a display mode, enabling the long axis of each liquid crystal molecule in the liquid crystal layer of the peep-proof device to be perpendicular to the polarization direction of the light beam entering the liquid crystal layer.

The above driving method may be applied to the peep-proof device with a non-cured liquid crystal layer. The deflection state of each liquid crystal molecule in the liquid crystal layer may be controlled through the electrode layers at the two sides of the liquid crystal layer respectively, so as to switch the display device between the peep-proof mode and the display mode.

A working principle of the driving method may refer to that mentioned above, and thus will not be particularly defined herein.

The above embodiments are preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A peep-proof device, comprising at least one light beam adjustment layer, wherein the at least one light beam adjustment layer comprises:
   a transparent base layer, a plurality of grooves being formed in a surface of the transparent base layer; and
   a liquid crystal layer arranged within the plurality of grooves,
   wherein a refractive index of the transparent base layer is same as a refractive index of the liquid crystal layer to an ordinary light beam;
   the plurality of grooves comprise first grooves, second grooves, and third grooves;
   a surface of each of the first grooves is a part of a spherical surface;
   a surface of each of the second grooves is a part of a conical surface;
   a surface of each of the third grooves is a part of a surface of a frustum of a prism; and
   the first grooves, the second grooves, and the third grooves are arranged alternately and continuously in an array form in the surface of the transparent base layer.

2. The peep-proof device according to claim 1, wherein the first grooves, the second grooves, and the third grooves have different sizes.

3. The peep-proof device according to claim 1, further comprising:
   a first transparent substrate and a second transparent substrate arranged opposite to the first transparent substrate,
   wherein the at least one light beam adjustment layer is arranged between the first transparent substrate and the second transparent substrate; and
   the plurality of grooves is formed in a surface of the at least one light beam adjustment layer proximate to the first transparent substrate.

4. The peep-proof device according to claim 3, wherein the at least one light beam adjustment layer comprises two light beam adjustment layers laminated one on another, one of the light beam adjustment layers is arranged between the other light beam adjustment layer and the first transparent substrate, and the grooves in the transparent base layers of the two light beam adjustment layers have different shapes, or different sizes, or different shapes and different sizes.

5. The peep-proof device according to claim 4, wherein the transparent base layers of the two light beam adjustment layers are made of a same material.

6. The peep-proof device according to claim 3, further comprising:
   a first transparent electrode layer arranged between the transparent base layer and the first transparent substrate; and
   a second transparent electrode layer arranged between the liquid crystal layer and the second transparent substrate.

7. The peep-proof device according to claim 1, wherein the liquid crystal layer comprises liquid crystal molecules, and the liquid crystal molecules have been cured in such a manner as to enable a long-axis direction of each of the liquid crystal molecules to be perpendicular to a plane where the first transparent substrate is located.

8. The peep-proof device according to claim 1, further comprising:
a polarizer arranged at a light-entering side of the at least one light beam adjustment layer, and configured to allow an incident light beam in a first polarization direction to pass through the polarizer,
wherein the first polarization direction is parallel to a first plane, and the first plane is perpendicular to the first transparent substrate and parallel to a direction in which a long side of the first transparent substrate extends.

9. The peep-proof device according to claim 8, further comprising:
a polarization state conversion mechanism arranged between the polarizer and the at least one light beam adjustment layer,
wherein the polarization state conversion mechanism is configured to allow the incident light beam in the first polarization direction to pass through the polarization state conversion mechanism, or convert the incident light beam in the first polarization direction into a light beam in a second polarization direction perpendicular to the first plane and emit the converted light beam in the second polarization direction.

10. A display device, comprising a display module and the peep-proof device according to claim 1,
wherein the peep-proof device is arranged at a light-exiting side of the display module, and a light beam from the display module is a linearly-polarized light beam.

11. The display device according to claim 10, wherein an orthogonal projection of each curved surface structure of the peep-proof device onto a first transparent substrate corresponds to at least one pixel unit of the display module.

12. A method for driving the display device according to claim 10, wherein a polarization direction of a linearly-polarized light beam from the display module is parallel to a first plane, the first plane is perpendicular to a plane where a first transparent substrate is located, and the first plane is parallel to a direction in which a long side of the first transparent substrate extends,
the method comprises: in a peep-proof mode, enabling a long axis of each of liquid crystal molecules in a liquid crystal layer of the peep-proof device to be perpendicular to the plane where the first transparent substrate is located.

13. The method according to claim 12, further comprising:
in a display mode, enabling the long axis of each of the liquid crystal molecules in the liquid crystal layer of the peep-proof device to be perpendicular to the polarization direction of light beam entering the liquid crystal layer.

14. A peep-proof device, comprising:
a first transparent substrate;
a second transparent substrate arranged opposite to the first transparent substrate; and
at least one light beam adjustment layer arranged between the first transparent substrate and the second transparent substrate,
wherein the at least one light beam adjustment layer comprises a plurality of microlens structures, each of the microlens structures comprises a transparent base layer and a liquid crystal layer, a plurality of grooves is arranged in a surface of the transparent base layer proximate to the first transparent substrate, and the grooves are filled with liquid crystal;
a long-axis direction of each of liquid crystal molecules in the liquid crystal layer is capable of being perpendicular to the first transparent substrate, and a refractive index of the transparent base layer is same as a refractive index of the liquid crystal layer to an ordinary light beam;
the plurality of grooves comprise first grooves, second grooves, and third grooves;
a surface of each of the first grooves is a part of a spherical surface;
a surface of each of the second grooves is a part of a conical surface;
a surface of each of the third grooves is a part of a surface of a frustum of a prism; and
the first grooves, the second grooves, and the third grooves are arranged alternately and continuously in an array form in the surface of the transparent base layer.

15. The peep-proof device according to claim 14, wherein the grooves in adjacent rows have different sizes.

16. The peep-proof device according to claim 14, further comprising:
a first transparent electrode layer arranged between the transparent base layer and the first transparent substrate; and
a second transparent electrode layer arranged between the liquid crystal layer and the second transparent substrate.

17. The peep-proof device according to claim 14, wherein the liquid crystal molecules in the liquid crystal layer have been cured in such a manner as to enable a long-axis direction of each of the liquid crystal molecules to be perpendicular to a plane where the first transparent substrate is located.

* * * * *